United States Patent
Lee et al.

(10) Patent No.: US 10,220,820 B2
(45) Date of Patent: Mar. 5, 2019

(54) VEHICLE AND METHOD FOR CONTROLLING THE SAME

(71) Applicant: Hyundai Motor Company, Seoul (KR)

(72) Inventors: Taeyoung Lee, Yongin-si (KR); Sukki Min, Suwon-si (KR); DongHyun Sung, Hwaseong-si (KR); Junghyun Kim, Seoul (KR); Sangmin Lee, Seoul (KR); Eungseo Kim, Suwon-si (KR); Yongseok Kwon, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 22 days.

(21) Appl. No.: 15/588,975

(22) Filed: May 8, 2017

(65) Prior Publication Data
US 2018/0170327 A1   Jun. 21, 2018

(30) Foreign Application Priority Data
Dec. 21, 2016   (KR) .......................... 10-2016-0175396

(51) Int. Cl.
*B60T 7/22* (2006.01)
*G06K 9/00* (2006.01)
*B60T 7/18* (2006.01)

(52) U.S. Cl.
CPC ............................ *B60T 7/22* (2013.01); *B60T 7/18* (2013.01); *G06K 9/00798* (2013.01); *B60T 2201/022* (2013.01); *B60T 2210/00* (2013.01); *B60T 2250/00* (2013.01); *G06K 9/00805* (2013.01)

(58) Field of Classification Search
CPC .... B60T 7/22; B60T 2250/00; B60T 2210/00; G06K 9/00798; G06K 9/00805
See application file for complete search history.

(56) References Cited

U.S. PATENT DOCUMENTS

| 2015/0183441 | A1* | 7/2015 | Aoki | B60W 40/09 |
| | | | | 434/62 |
| 2015/0324652 | A1* | 11/2015 | Mizutani | G01S 13/726 |
| | | | | 382/103 |
| 2016/0357187 | A1* | 12/2016 | Ansari | G01S 15/931 |
| 2017/0210382 | A1* | 7/2017 | Nishimura | B60W 10/18 |
| 2018/0134285 | A1* | 5/2018 | Cho | B60W 10/06 |
| 2018/0194364 | A1* | 7/2018 | Asakura | B60W 50/02 |

FOREIGN PATENT DOCUMENTS

| JP | H 5-110906 A | 4/1993 |
| JP | 2006-11570 A | 1/2006 |
| JP | 2010-73007 A | 4/2010 |
| JP | 2011-103058 A | 5/2011 |
| JP | 2016-57677 A | 4/2016 |

* cited by examiner

*Primary Examiner* — Rodney A Butler
(74) *Attorney, Agent, or Firm* — Morgan, Lewis & Bockius LLP

(57) ABSTRACT

A vehicle and a method for controlling a same are disclosed, wherein the method for controlling the vehicle may include acquiring road type information from at least one of another vehicle, a server, an infrastructure, and a user interface (UI) configured to perform a navigation function; recognizing traveling lane information on a basis of image information detected by an image detector; establishing an obstacle existable region on a basis of the recognized traveling lane information; acquiring information regarding an obstacle from among obstacles detected by an obstacle detector on a basis of the established obstacle existable region; and controlling an anti-collision function on a basis of the obstacle information.

12 Claims, 10 Drawing Sheets

VEHICLE AND METHOD FOR CONTROLLING THE SAME

CROSS-REFERENCE TO RELATED APPLICATION

The present application claims priority to Korean Patent Application No. 10-2016-0175396, filed on Dec. 21, 2016, the entire contents of which is incorporated herein for all purposes by this reference.

BACKGROUND OF THE INVENTION

Field of the Invention

Embodiments of the present invention relate to a vehicle for preventing a collision with an obstacle, and a method for controlling the same.

Description of Related Art

A vehicle is an apparatus to move on the road by the driving of vehicle wheels for the purpose of transporting persons or cargo.

In recent times, the vehicle may include at least one of an ultrasonic sensor, an image sensor, a laser sensor, and a Light Detection And Ranging (LiDAR) sensor, each of which can substitute for the user's field of vision, may collect information related to traveling of the vehicle using at least one sensor, may recognize a forward obstacle, and may output the recognized information to allow the vehicle driver to recognize the obstacle resulting in the prevention of a traffic accident.

When the vehicle recognizes an object using an image sensor, the shadow of an ego vehicle or the shadow of a peripheral vehicle may be misunderstood as a vehicle, or false alarm or non-alarm may occur by the direct sunlight, an object reflecting light, or backward high-intensity light source or a low-illuminance environment.

Although the presence or absence of an obstacle can be confirmed when the vehicle recognizes the object using the distance sensor, such as an ultrasonic sensor, a road sign, a slope, or a speed bump may be misinterpreted as an obstacle. In the present case the vehicle may have difficulty in correctly recognizing the object.

In addition, it is impossible for the vehicle to recognize roads or buildings located approximately 200 m or more from the vehicle in a forward direction when the vehicle desires to recognize the target object using a LiDAR or radar sensor. The vehicle also has difficulty in correctly recognizing the target object when unexpected situations (e.g., a road having no lane, pothole, bad weather, etc.) occur, resulting in a higher difficulty to maintain safe driving.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle for acquiring traveling information, environmental information, as well as road and navigation information acquired from an image acquisition part; and acquiring road type information on the basis of the information received from an external vehicle, establishing a presence-available region for each obstacle type determined by the acquired road type information, and controlling a warning and the braking of the vehicle on the basis of the determined presence-available region for each obstacle type, and a method for controlling the same.

Another aspect of the present invention is directed to provide a vehicle for determining whether an obstacle is misunderstood on the basis of the road type information and ego-vehicle lane information, excluding the misunderstood obstacle from the list of collision-available obstacles, and a method for controlling the same.

Additional aspects of the invention will be set forth in part in the description which follows and, in part, will be obvious from the description, or may be learned by practice of the invention.

In accordance with an aspect of the present invention, a vehicle may include an image detector configured to acquire image information from a peripheral region; an obstacle detector configured to detect an obstacle; a communication interface configured to receive current position information; and a controller configured to acquire type information of a road on the basis of the current position information and navigation information during execution of a navigation function, recognize a traveling lane on the basis of the image information, establish an existable region of an obstacle on the basis of the acquired road type information and the recognized traveling lane information, determine whether or not the detected obstacle is true or false on the basis of information regarding the established obstacle existable region, and control an anti-collision function on the basis of the determined true or false information of the obstacle.

The communication interface may communicate with at least one of another vehicle, a server, and an infrastructure; and the controller may acquire road type information on the basis of communication information received by the communication interface.

The controller may recognize an obstacle on the basis of the image information.

When the other lane is present in a side portion of the recognized traveling lane, the controller may establish a borderline of an obstacle existable region on the basis of a lane of the other lane; and when the other lane is not present in the side portion of the recognized traveling lane, the controller may establish a borderline of an obstacle existable region on the basis of a boundary line of a detection region of an image detector or an obstacle detector.

The vehicle may further include a traveling information detector configured to detect traveling information, wherein the controller is configured to estimate a traveling route on the basis of the detected traveling information, confirms position information of the detected obstacle, acquires information regarding an obstacle indicating a warning target contained in the estimated traveling route on the basis of the estimated traveling route and the detected obstacle position information, and acquires actual obstacle information from among information of the warning-target obstacle on the basis of information regarding the obstacle existable region.

When the obstacle existable region is established, the controller may determine a type of an existable obstacle on the basis of the road type information, and may establish an obstacle existable region for each determined obstacle type.

The controller may confirm a probability of existence of each obstacle in each of left and right regions of the traveling route on the basis of the road type information and the traveling lane information, and may establish an obstacle existable region in one region in which the confirmed probability is equal to or higher than a reference probability.

The vehicle may further include: a warning device configured to output warning information on the basis of a command of the controller; and a braking device configured to control braking force on the basis of a command of the controller.

The controller may control at least one of the warning device and the braking device on the basis of the obstacle type.

In accordance with another aspect of the present invention, a method for controlling a vehicle may include acquiring road type information from at least one of another vehicle, a server, an infrastructure, and a user interface (UI) configured to perform a navigation function; recognizing traveling lane information on the basis of image information detected by an image detector; establishing an obstacle existable region on the basis of the recognized traveling lane information; acquiring information regarding an actual obstacle from among obstacles detected by an obstacle detector on the basis of the established obstacle existable region; and controlling an anti-collision function on the basis of the actual obstacle information.

The method may further include: detecting an obstacle on the basis of the image information.

The establishing the obstacle existable region may include: when the other lane is present in a side portion of the recognized traveling lane, establishing a borderline of an obstacle existable region on the basis of a lane of the other lane; and when the other lane is not present in the side portion of the recognized traveling lane, establishing a borderline of an obstacle existable region on the basis of a boundary line of a detection region of an image detector or an obstacle detector.

The acquiring the actual obstacle information may include detecting traveling information; estimating a traveling route on the basis of the detected traveling information; acquiring information regarding an obstacle indicating a warning target contained in the estimated traveling route on the basis of the estimated traveling route information and the detected obstacle position information; and acquiring actual obstacle information from among information of the warning-target obstacle on the basis of information regarding the obstacle existable region.

The establishing the obstacle existable region may include: confirming a probability of existence of the obstacle in each of left and right regions of the traveling route on the basis of the road type information and the traveling lane information; confirming type information of an obstacle, which is located in the right region and has a sufficient existence probability higher than a reference probability; establishing an existable region of the confirmed obstacle type; confirming type information of an obstacle, which is located at the right region and has a sufficient existence probability higher than a reference probability; and establishing an existable region of the confirmed obstacle type.

The controlling the anti-collision function may include: controlling at least one of a warning device and a braking device on the basis of the obstacle type.

The establishing the obstacle existable region may include: acquiring an actual traveling route on the basis of the traveling lane information and the road type information; and establishing an obstacle existable region in left and right directions of the traveling lane on the basis of the acquired actual traveling route.

The methods and apparatuses of the present invention have other features and advantages which will be apparent from or are set forth in more detail in the accompanying drawings, which are incorporated herein, and the following Detailed Description, which together server to explain certain principles of the present invention.

Figure 1:
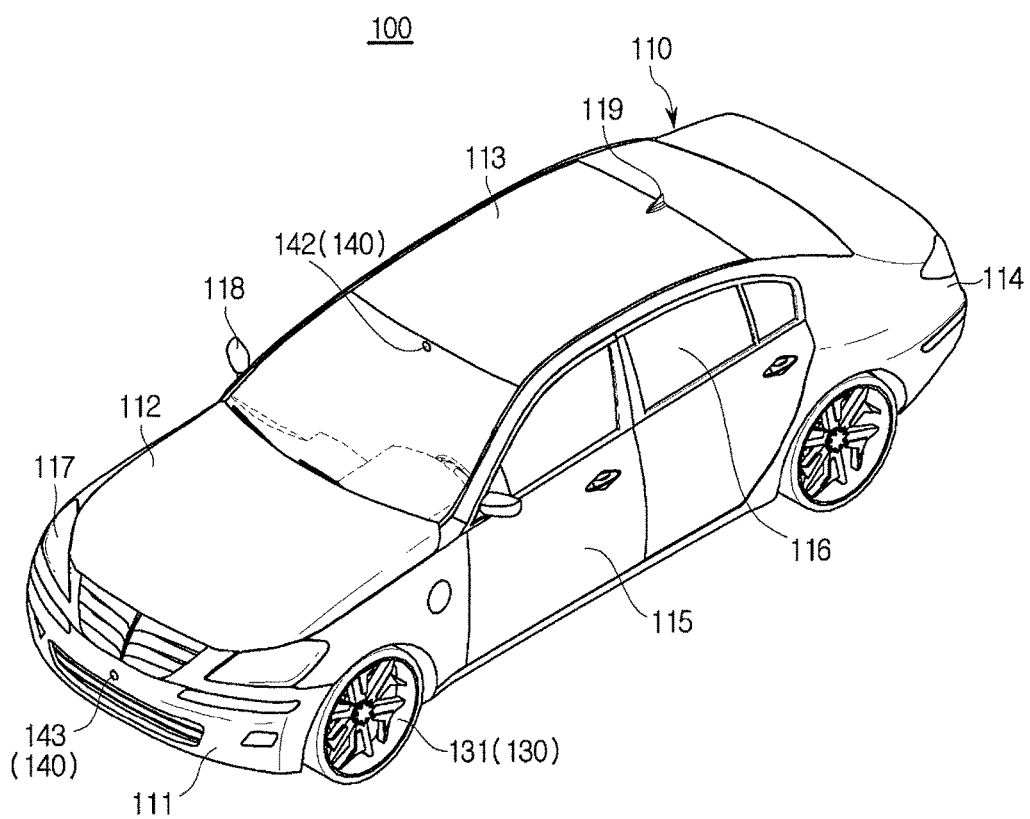
FIG. 1 is a perspective view illustrating the external view of a vehicle according to an exemplary embodiment of the present invention.

It may be understood that the appended drawings are not necessarily to scale, presenting a somewhat simplified representation of various features illustrative of the certain principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawings.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Hereinbelow, exemplary embodiments of the present invention will be described with reference to the accompanying drawings. Throughout the drawings, the same reference numerals refer to like elements throughout.

A vehicle 100 may include a body having an external part 110 and an internal part 120, and a chassis 130 which is a remaining portion other than the body 100 and is equipped with mechanisms required for driving thereof.

Referring to FIG. 1, the external part 110 of the body may include a front panel 111, a bonnet (also called a hood) 112, a roof panel 113, a rear panel 114, front and rear doors 115 located left and right sides of vehicle 110, and windows 116 disposed at the front and rear and left and right doors 115.

The external part 110 of the body may further include a lighting part 117 which allows a vehicle driver to look forward as well as to view all peripheral information of the vehicle, and also performs a signaling and communication function for other vehicles; pillars provided at boundaries among the windows of the front and rear and left and right doors 115; and side-view mirrors 118 to provide a rear view of the vehicle 1 to the vehicle driver.

The external part of the body may further include an antenna 119 configured for performing Vehicle to Everything (V2X) communication including Vehicle-to-Vehicle (V2V) or Vehicle-to-Infrastructure (V2I) communication.

Figure 2:
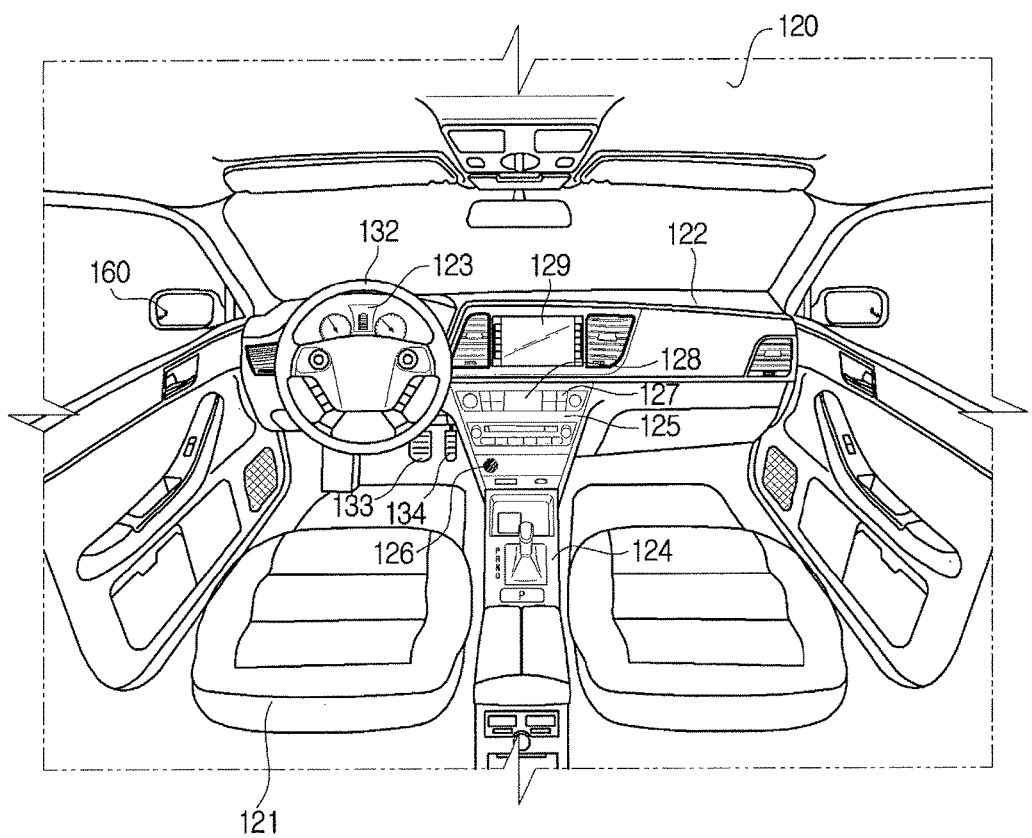
FIG. 2 is a view illustrating the internal view of the vehicle according to an exemplary embodiment of the present invention.

Referring to FIG. 2, the internal part 120 of the body 100 may include seats 121 on which a passenger sits; a dashboard 122; an instrument panel 123 (i.e., a cluster) (may include a tachometer, a speedometer, a coolant thermometer, a fuel gauge, a turn signal indicator, a high beam indicator light, a warning light, a seat belt warning light, a mileage indicator, an odometer, an automatic transmission shift indicator, a door open warning light, an engine oil warning light, and a fuel shortage warning light, which are disposed on the dashboard 122 to output information related to driving); a center fascia 124 may include an air vent of the air conditioner and a control panel; a head device 125 mounted to the center fascia 124 configured to receive operation commands from the audio device and the air conditioner; and a starting part 126 located in the center fascia 124 to receive an ignition command.

The vehicle may include a shift lever provided to the center fascia 124 to receive a shift position, and a parking button (EPB button) located in a peripheral region of the shift lever or in the head part 125 to receive an operation command of an electronic parking brake (EPB) device.

The vehicle 100 may further include an input part 127 configured to receive an operation command of at least one function from among a plurality of functions configured for being executed in the vehicle 1.

The input part 127 may be provided in the head device 125 and the center fascia 124, and may include an ON-OFF button of respective functions and at least one physical button (including a button for changing the setting values of respective functions).

The input part 127 may be implemented as a jog dial or touchpad through which the user can input a movement command of a cursor displayed on the display of the user interface (UI) 140, a selection command, etc.

Here, the jog dial or the touchpad may be provided in the center fascia or the like.

The vehicle 100 may be provided in the head device 125, and may further include a display 128 configured to display not only information regarding the executed function but also user-input information.

The vehicle 100 may further include the user interface (UI) 129 for user convenience.

The user interface (UI) 129 may display images regarding at least one user-selected function selected among various functions, for example, an audio function, a video function, a navigation function, a broadcast function (DMB function), and a radio function.

The user interface (UI) 129 may also display images of front, rear, left and right directions during autonomous traveling.

The user interface (UI) 129 may be embedded in the dashboard or may be disposed as a stationary device on the dashboard.

The user interface (UI) 129 may include a display panel acting as the display, and may include a touch panel acting as the input part.

That is, the user interface (UI) 129 may include only a display panel, and may include a touchscreen formed by integration of the display panel and the touch panel.

When only the display panel is provided as the user interface (UI) 129, the driver or user may select one of buttons displayed on the UI 129 using the input part 127 mounted to the center fascia.

When the UI 129 is implemented as a touchscreen, the UI 129 may receive a user's operation command through the touch panel.

As described above, the user interface 129 may include a display, and may further include an input part.

The chassis 130 of the vehicle is configured to support the bodies 110 and 120 of the vehicle, and may include vehicle wheels 131 respectively disposed at the front, rear, left and right sides; a power device to apply driving force to the front, rear, left and right wheels 131; a steering device; a brake device to apply braking force to the wheels 131; and a suspension device to adjust the suspension of the vehicle.

The vehicle 100 may include a steering wheel 132 of the steering device to steer the vehicle 100, a brake pedal 133 depressed by the driver's foot according to the driver's brake intention, and an accelerator pedal 134 depressed by the driver according to the driver's acceleration intention, as shown in FIG. 2.

Figure 4:
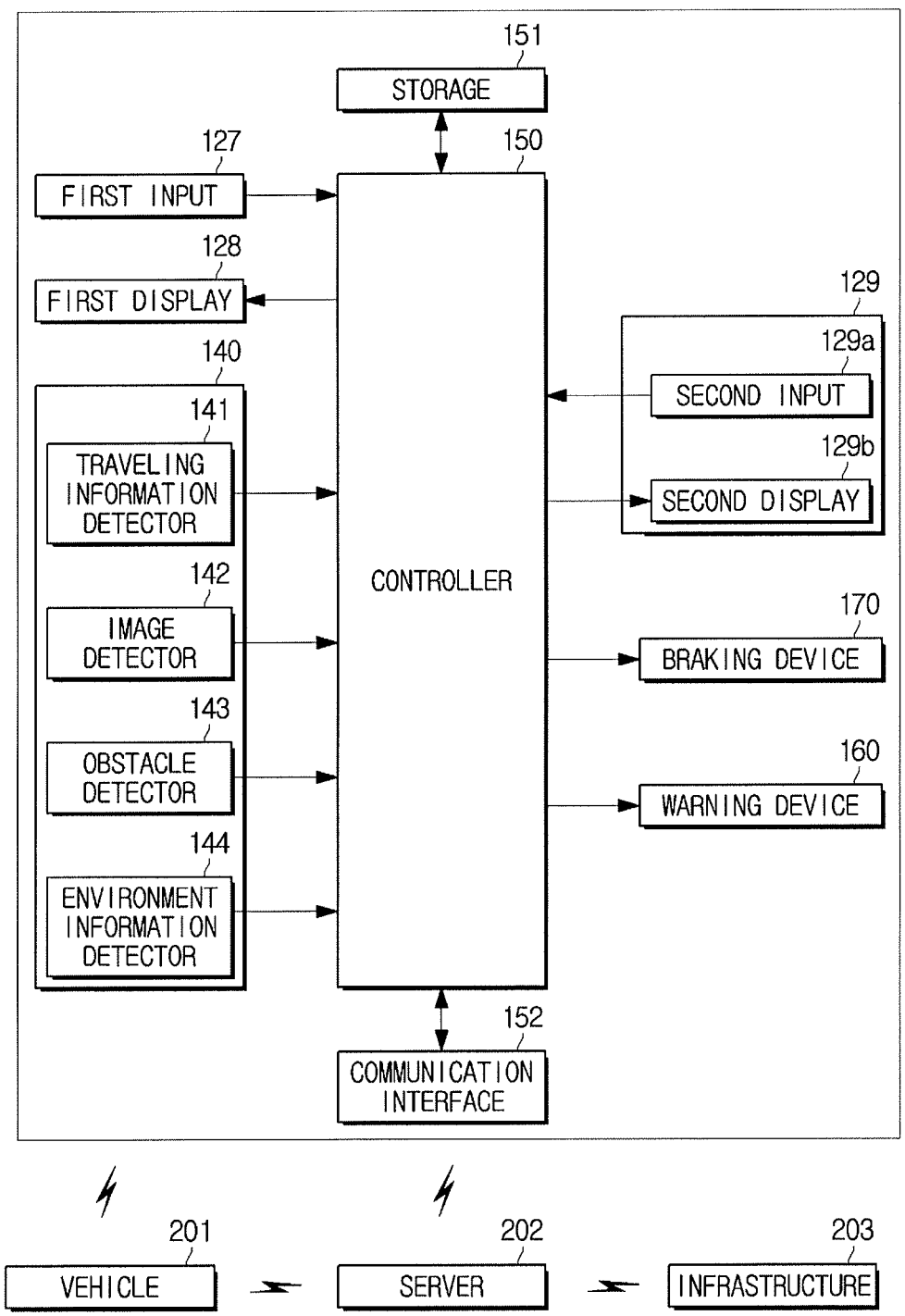
FIG. 4 is a block diagram illustrating a vehicle according to an exemplary embodiment of the present invention.

The vehicle 100 may further include a communication interface configured to implement communication between internal electronic devices of the vehicle 100, communication with a user equipment (UE), and communication with a storage medium, as shown in FIG. 4.

The communication interface may communicate with the external device through the antenna 119.

Here, the external device may include at least one of another vehicle, a server, and an infrastructure.

Figure 3:
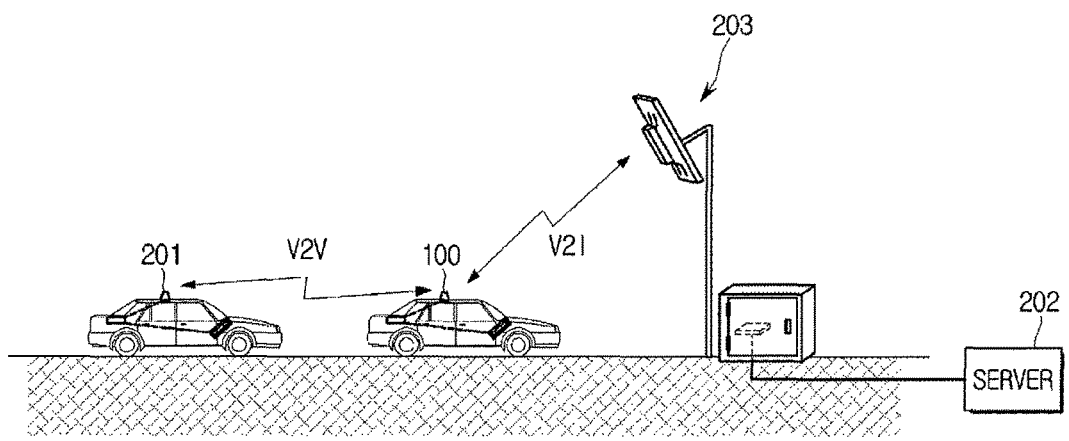
FIG. 3 is a conceptual diagram illustrating a communication method between vehicles according to an exemplary embodiment of the present invention.

As shown in FIG. 3, the communication interface of the vehicle may implement V2V communication between one vehicle (i.e., an ego vehicle) and the other vehicle (i.e., a peripheral vehicle) 201.

In other words, the ego vehicle 100 and the peripheral vehicle 210 may communicate with each other to implement V2V communication, wherein position information and traveling information of the ego vehicle 100 and the peripheral vehicle 210, road environment information, and satellite information can be communicated between the ego vehicle 100 and the peripheral vehicle 210.

The communication interface of the vehicle may perform V2I communication between the server 202 and the infrastructure 203, wherein the communication interface can receive traffic information and other information collected by the other vehicle.

That is, the server 202 may receive traffic information and road environment information from a plurality of vehicles, and may provide the received information to the plurality of vehicles.

The infrastructure 203 of the road may transmit and receive vehicle information and road information to or from the server 202.

That is, the infrastructure 203 may receive electromagnetic waves emitted from the antenna of the vehicle 100, may transmit electrical signals corresponding to the received electromagnetic waves to the server 202, may convert the electrical signals received from the server 202 into electromagnetic waves, and may emit the converted electromagnetic waves.

In the instant case, the communication interface of the vehicle 100 may receive electromagnetic waves from the infrastructure 203 through the antenna 119, and may transmit the electrical signal corresponding to the received electromagnetic waves to the controller.

Therefore, the vehicle may receive infrastructure position information and road environment information to communicate with the infrastructure 203.

The communication scheme based on the antenna may include a 2G communication scheme, a 3G communication scheme, a 4G communication scheme, and/or a 5G communication scheme. For example, the 2G communication scheme may be Time Division Multiple Access (TDMA), Code Division Multiple Access (CDMA), etc. For example, the 3G communication scheme may be Wideband Code Division Multiple Access (WCDMA), CDMA2000 (Code Division Multiple Access 2000), Wireless Broadband (Wi-Bro), World Interoperability for Microwave Access (Wi-MAX), etc. For example, the 4G communication scheme may be Long Term Evolution (LTE), Wireless Broadband Evolution, etc.

As described above, the vehicle may perform V2X (Vehicle to everything) communication including V2V or V2I communication with another vehicle, wherein the vehicle can acquire various kinds of information needed for vehicle traveling.

The vehicle 100 may further include various safety devices configured to guarantee safety of the vehicle driver and passengers.

There are various kinds of vehicle safety devices, for example, an anti-collision device for preventing collision between the ego vehicle and the peripheral obstacle, a warning device for informing the vehicle driver and passengers of a dangerous situation such as collision, an airbag control device for protecting the driver and passengers during vehicle collision, an electronic stability control (ESC) device for stabilizing vehicle orientation during acceleration or cornering of the vehicle, and an anti-lock brake system (ABS) for preventing lock-up of wheels during sudden braking. etc.

The vehicle may further include a detection part configured for detecting road information to determine whether or not safety devices are controlled.

The detection part 140 may include a traveling information detector 141 configured to detect vehicle traveling information including the speed and traveling direction of the vehicle, an image detector 142 configured to detect image information of one or more peripheral objects, an obstacle detector 143 configured to detect one or more peripheral obstacles, and an environment information detector 144 configured to detect environmental information including weather information (See FIG. 4).

The image detector 142 may include a CCD or CMOS image sensor, and may also include a three-dimensional (3D) spatial recognition sensor including a KINECT (RGB-D sensor, TOF (Structured Light Sensor), a stereo camera, etc.

The image detector 142 may be mounted to a windshield, and internal windows of the vehicle, or may be provided to an internal compartment mirror of the vehicle. Alternatively, the image detector 142 may be provided to the roof panel 113, and may be exposed to the outside (See FIG. 1).

The image detector 142 may include at least one of a front-view camera to acquire front-view images of the vehicle, a left-view camera and a right-view camera to acquire left-view, right-view, and lateral-view images of the vehicle, and a rear-view camera to acquire rear-view images of the vehicle.

In the instant case, an obstacle detector 143 may be provided to the front panel 111, the roof panel 113, and the rear panel 114 of the vehicle (See FIG. 1).

FIG. 4 is a block diagram illustrating a vehicle according to an exemplary embodiment of the present invention.

Referring to FIG. 4, the vehicle 100 may include a first input 127, a first display 128, a user interface (UI) 129, a detection part 140, a controller 150, a storage 151, a communication interface 152, a warning device 160, and a braking device 170.

To distinguish the input part 127 and the display 128 mounted to at least one of the center fascia 124 and the head device 125 from the input part 129*a* and the display 129*b* mounted to the UI 129, the input part 127 and the display 128 mounted to at least one of the center fascia 124 and the head device 125 will hereinafter be referred to as the first input 127 and the first display 128, and the input part 129*a* and the display 129*b* mounted to the user interface (UI) will hereinafter be referred to as the second input 129*a* and the second display 129*b*.

The first input 127 may receive a command configured for performing the anti-collision function.

The anti-collision function may be set as a default option.

The anti-collision function may be automatically carried out during the autonomous traveling mode.

Here, the anti-collision function may include at least one of a blind spot warning function, a lane change warning function, a forward collision warning function, and a rear and rear-lateral collision warning function.

The first input 127 may receive destination information during a navigation function.

The first display 128 may output visual information regarding execution of the anti-collision function.

The user interface (UI) 129 may include a second input 129*a* to receive operation information from the user, and a second display part 129*b* to output operation information regarding the underway function.

The second input 129*a* of the user interface (UI) 129 may receive at least one of the functions.

The second input 129*a* of the user interface (UI) 129 may receive a command for establishing communication with another vehicle, and may receive a command for establishing communication with the server.

The second input 129*a* of the user interface (UI) 129 may also receive a command for performing the anti-collision function.

When the navigation function is selected, the second display 129*b* of the UI 129 may display a map image within a predetermined range from a current position of the vehicle. When the destination is input, the second display 129*b* may display map information obtained when a route from the current position to the destination is matched.

The second display 129*b* of the UI 129 may output collision information during the navigation function.

For example, collision information may include road type information, attention requesting direction information, obstacle type information requesting attention for each road type, etc.

The second display 129*b* of the UI 129 may display collision information using screen colors, letters, emoticons, etc.

The detection part 140 may include a traveling information detector 141, an image detector 142, a distance detector 143, and an environment information detector 144.

The traveling information detector 141 may include a speed detector configured to detect a vehicle speed, a steering detector configured to detect a traveling direction of the vehicle, and a braking force detector configured to detect braking force of the vehicle.

In the instant case, a speed detector may include at least one of an acceleration detector configured to detect acceleration of the vehicle, and a plurality of wheel speed detectors to respectively detect wheel speeds of front, rear, left and right wheels of the chassis.

The steering detector may include at least one of a steering angle detector configured to detect a steering speed, a steering direction, and a steering angle of the steering wheel, and a yaw-rate detector configured to detect an angular speed of the vehicle body.

That is, the steering information may include a steering speed, a steering direction, a steering angle, etc. of the steering wheel.

The braking force detector may include a pressure detector configured to detect a hydraulic pressure of the braking device.

The image detector 142 may detect external environmental information of the ego vehicle at the current position of the ego vehicle. Especially, the image detector 142 may detect information regarding the vehicle traveling road, information regarding peripheral objects located in the front, left, right, and side directions of the ego vehicle, may convert the detected information into an electrical signal, may acquire image information regarding the electrical signal, and may transmit the acquired image information to the controller 150.

The obstacle detector 143 may detect the presence or absence of peripheral obstacles located in the front, rear, left and right directions of the ego vehicle, and may detect the position of each of the detected obstacles.

In more detail, the obstacle detector 143 may detect information regarding external obstacles of the vehicle. For example, the obstacle detector 143 may detect information needed to recognize a preceding vehicle traveling in a forward direction of the ego vehicle, a stopped object including a structure disposed in the vicinity of the road, and another oncoming vehicle in an opposite lane.

That is, the obstacle detector 143 may output detection information of the obstacles located in the front, rear, and left and right directions of the ego vehicle.

The obstacle detector 143 may include a distance detector configured to detect a distance to the obstacle.

In the instant case, a distance detector may include a radar sensor or a LiDAR sensor.

The radar sensor may detect the position and distance of each object using reflected waves generated by emission of radio waves when signal transmission and signal reception are performed at the same position.

The LiDAR sensor may be a non-contact type distance detection sensor using Laser and Radar principles.

The LiDAR sensor has a high detection accuracy in a transverse direction as compared with a Radio Detecting And Ranging (RaDAR) sensor, resulting in higher accuracy of the process for determining the presence or absence of a passage located in a forward direction.

In the instant case, a laser may be a single laser pulse.

The obstacle detector 143 may include an ultrasonic sensor or a radar sensor.

The ultrasonic sensor may generate ultrasonic waves for a predetermined time, and may detect a signal reflected from the object.

The ultrasonic sensor may recognize the presence or absence of obstacles including pedestrians within a short distance.

The environment information detector 144 may include at least one of a rain sensor to detect the presence or absence of rainfall and the amount of rainfall, an illuminance sensor to detect illuminance, an indoor temperature sensor to detect an indoor temperature, and an outdoor temperature sensor to detect an outdoor temperature.

The controller 150 may confirm current position information and destination information during the navigation function, may acquire information regarding a route from the current position to the destination on the basis of the confirmed destination information, and may control display of map information matched to the acquired route information.

The controller 150 may estimate a route of the vehicle on the basis of speed information and steering information of the vehicle, and may recognize position information of an obstacle acting as a warning target on the basis of the obstacle position information and the estimated route information detected by at least one of the image detector and the obstacle detector.

In more detail, the controller 150 may receive an image signal detected by the image detector 142, may perform signal processing of the received image signal, may change the size and format to increase the signal processing speed, and may improve image quality.

The controller 150 may perform clearing of the image signal, may perform noise cancellation to generate image information, and may recognize a vehicle lane on the basis of the generated image information.

The controller 150 may extract each obstacle corresponding to the object from image information by applying vision technologies configured for decomposing the object of the image information into a plurality of sections.

The controller 150 may identify the size and position of each obstacle on the basis of image information, and may determine the position and trace of each obstacle, wherein the controller 150 can determine whether the obstacle is a bicycle, a pedestrian, a road sign, a traffic light, or another vehicle.

The controller 150 may group spot data detected by the obstacle detector 143, wherein the controller 150 may recognize information regarding the shape and position of each obstacle. In addition, the controller 150 may also identify the obstacle type on the basis of shape information of each obstacle.

That is, the controller 150 may recognize information regarding the shape and position of each obstacle on the basis of not only the direction and distance between the ego vehicle and the obstacle but also the number of spots.

To recognize the obstacle, the controller 150 may also correct information regarding the shape and position of the obstacle detected by the obstacle detector 143 on the basis of image information detected by the image detector 142.

The controller 150 may also correct information regarding the type and position of each obstacle on the basis of environmental information.

The controller 150 may acquire road type information on the basis of route information and map information from among navigation information, and may recognize a traveling lane (hereinafter referred to as an ego-vehicle lane) of the ego vehicle on the basis of the acquired road type information and the recognized lane information.

In the instant case, an ego-vehicle lane may be a lane on which the ego vehicle runs.

The road type information may include road type information (e.g., expressway, national highway, high-level road, general national road, local road, country road, city road, etc.), information regarding the number of lanes of each road, and safety zone information including a school zone.

The road type information may include road shape information including a curved road and a straight road, and may further include information regarding a total number of lanes of the road on which the ego vehicle located.

The controller 150 may acquire road type information on the basis of information received from at least one of the peripheral vehicle 201, the server 202, and the infrastructure 203 when communicating with at least one of the peripheral vehicle 201, the server 202, and the infrastructure 203, and may also recognize the ego-vehicle lane on the basis of the acquired road type information and the recognized lane information.

The controller 150 may recognize the type of an obstacle configured for being located at the right and left sides of the ego-vehicle lane on the basis of the road type information and the ego-vehicle lane information, may determine the probability of existence for each obstacle on the basis of the recognized obstacle type, and may establish the existable region for each obstacle type on the basis of the determined existable region for each obstacle.

In more detail, the controller 150 may confirm the probability of existence for each obstacle in the left region of the traveling lane on the basis of the road type information and the lane information, may acquire type information of any obstacle having a sufficient existence probability higher than a reference probability, and may establish the existable region of the obstacle located in the left region of the ego-vehicle lane on the basis of the acquired obstacle type information.

The controller 150 may confirm the probability of existence for each obstacle in the right region of the traveling lane on the basis of the road type information and the lane information, may acquire type information of any obstacle having a sufficient existence probability higher than a reference probability, and may establish the existable region of the obstacle located at the right side of the ego-vehicle lane on the basis of the acquired obstacle type information. The controller 150 may recognize any one lane from among the left lane and the right lane of the ego-vehicle lane, and may establish a border of the existable region of the obstacle on the basis of lane information of the recognized resultant lane. In association with the other side in which another lane does not exist, the controller 150 may establish a border of the existable region of the obstacle on the basis of a boundary line of the image detector or the obstacle detector.

The controller 150 may recognize an actual obstacle from among obstacles to be used as the warning targets on the basis of not only information regarding the existable region for each established obstacle type but also position information of each recognized obstacle to be used as a warning target, may recognize the existable region for each obstacle type, and may control the warning device 160 and the braking device 170 for anti-collision on the basis of type information of the actual obstacle for each recognized existable region and position information of the actual obstacle.

As described above, the controller 150 may establish the existable region for each obstacle type in each of the right and left regions of the ego-vehicle lane on the basis of the road type information and the ego-vehicle position information.

For example, the controller 150 may establish the existable region of the pedestrian and the existable region of another vehicle within the left region of the ego vehicle, and may also establish the existable region of the pedestrian and the existable region of another vehicle within the right region of the ego vehicle.

That is, the controller 150 may recognize the actual obstacle contained in the existable region for each obstacle type, and may control the warning device 160 and the braking device 170 in different ways according to the obstacle type and the obstacle position.

For example, the controller 150 may select a warning sound type on the basis of the obstacle type, may control output of the selected warning sound, and may control a volume of warning sound on the basis of the distance to the obstacle.

When the existable region of the obstacle is an existable region of different types of obstacles, the controller may also recognize the type of each obstacle on the basis of image information detected by the image detector and the obstacle shape information detected by the obstacle detector.

The controller 150 may control the anti-collision function on the basis of existable region information for each obstacle type and position information of the actual obstacle. In more detail, the controller 150 may confirm type information of the actual obstacle contained in the obstacle existable region on the basis of at least one of image information detected by the image detector and shape information of the obstacle detected by the obstacle detector, and may finally control the anti-collision function.

The controller 150 may acquire the actual route (the shape of the actual road) on which the ego vehicle will run on the basis of map information matched to route information and the recognized lane information, may generate a left borderline and a right borderline on the basis of the acquired route information and lane information, and may establish the existable region of the left-side obstacle and the existable region of the right-side obstacle on the basis of position information of the generated borderline.

The controller 150 may acquire information regarding the distance to the obstacle on the basis of current position information of the ego vehicle and position information of the obstacle, and may control braking of the braking device on the basis of the obstacle type information and information regarding the distance to the obstacle.

The controller 150 may control lamps or the warning device to warn a driver of another vehicle or pedestrian(s).

The controller 150 may change the traveling direction by controlling the steering device to prevent collision with another vehicle or pedestrian(s).

The controller 150 may inform the vehicle driver of a first probability of danger by turning on the warning light mounted to side-view mirrors, may perform visual warning by turning on the warning light, and at the same time may inform the vehicle driver of a second probability of danger by controlling vibration of the seat belt.

The controller 150 may immediately perform braking by controlling a pre-fill function of the braking device. When there occurs an extremely dangerous situation in which there is a high possibility of collision, the controller 150 may also control an automatic deceleration function (also called a pre-brake function) within a predetermined scope.

In addition, the controller 150 may control a Brake Assist System (BAS) function of the braking device according to the degree of possibility of collision, and may control the seat belt wherein the driver's body can also be fastened to the driver seat.

The controller 150 may determine the possibility of collision on the basis of the distance between the ego vehicle and the obstacle. When the distance between the ego vehicle and the obstacle is shorter than a reference distance, the controller 150 may determine occurrence of an extremely dangerous situation in which there is a high possibility of collision between the ego vehicle and the obstacle.

The controller 150 may be a Central Processing Unit (CPU) or a Micro Control Unit (MCU), or may be a processor.

The storage 151 may store an algorithm for establishing the left region and the right region on the basis of position information of the ego vehicle. The present algorithm may be an algorithm based on the actual route information and a quadratic function.

The storage 151 may store obstacle type information and a braking function and braking information corresponding to the distance to the obstacle, and may further store not only a warning sound type corresponding to the obstacle type information, but also volume information of the warning sound corresponding to the distance to the obstacle.

The storage 151 may include a volatile memory and a non-volatile memory. The volatile memory may be an SRAM or DRAM, and the non-volatile memory may include at least one of flash memory, Read Only Memory (ROM), Erasable Programmable Read Only Memory (EPROM), Electrically Erasable Programmable Read Only Memory (EEPROM), etc.

The storage 151 may also be incorporated with the controller 150 as necessary.

The communication interface 152 may communicate with various kinds of electronic devices embedded in the vehicle, and may also communicate with a user terminal (hereinafter referred to as a user equipment UE) and a storage medium.

The user equipment (UE) may include a tablet, a smartphone, a Personal Digital Assistants (PDA), a laptop, etc. The storage medium may include an external hard disk drive (HDD), a USB memory, an optical disc, etc.

The communication interface 152 may include a CAN communication module, a Wi-Fi communication module, a USB communication module, and a Bluetooth communication module.

The communication interface 152 may further include a GPS reception part to acquire position information from a satellite, and may further include a broadcast communication interface including DMB Transport Protocol Experts Group (TPEG), SXM, and RDS.

The communication interface 152 may communicate with the external device through the antenna 119.

Here, the external device may include at least one of the other vehicle, the server, and the infrastructure (See FIG. 3).

The communication interface 152 may further receive weather information from a weather server as necessary.

The warning device 160 may output warning information on the basis of a command of the controller 150.

The warning device 160 may include a speaker configured to output the warning sound.

The warning device 160 may adjust the volume of the warning sound being output through the speaker.

The warning device 160 may include at least one of a warning light mounted to the side-view mirrors, a warning light mounted to the cluster, and a warning light embedded in the vehicle.

The warning device 160 may be a second display 129b of the user interface (UI).

The warning device 160 may include a vibration device mounted to the seat belt, and may further include a vibration device mounted to the driver seat.

The braking device 170 may control the plurality of wheels to respectively generate different braking forces on the basis of the command of the controller 150.

The braking device 170 may include a master cylinder, a wheel cylinder, a brake shoe or pad.

The braking device 170 may transmit constant hydraulic pressure generated from the master cylinder to the respective wheel cylinders, and may transmit such hydraulic pressure to the brake shoe or pad using the wheel cylinder such that the braking device 170 is compressed onto the drum or disc. As a result, the braking device 170 may generate brake force by rubbing the inside or outside of the brake shoe or pad.

The brake device 170 may perform the pre-fill function and the brake assist system (BAD) function.

Figure 5:
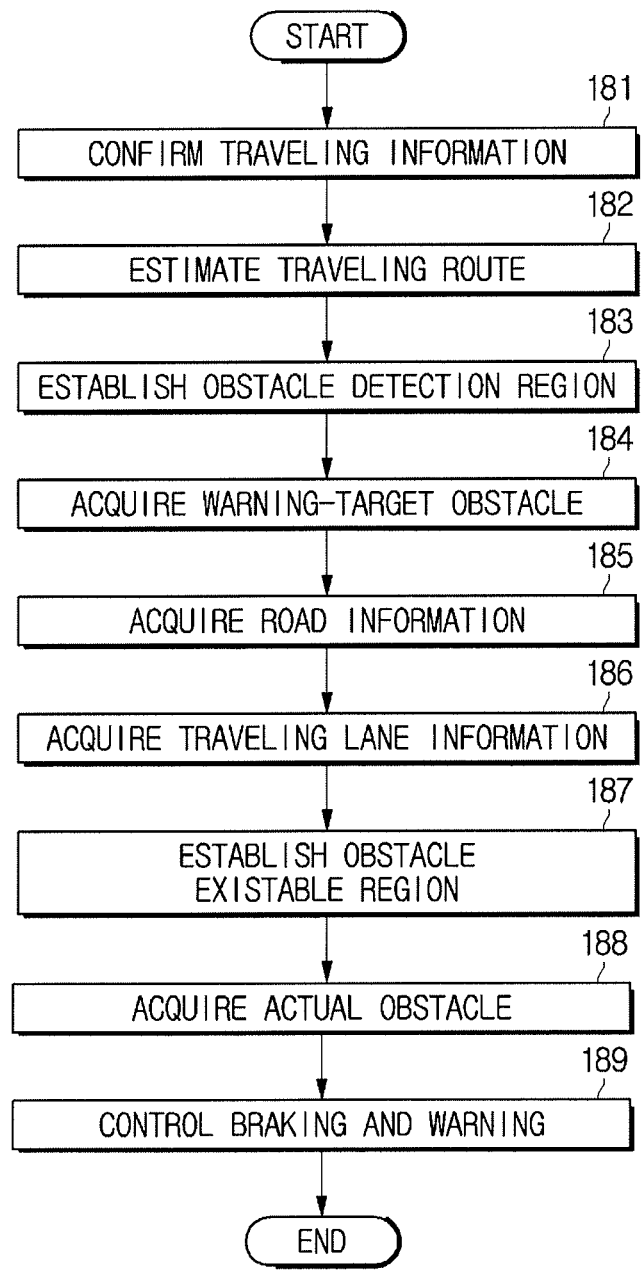
FIG. 5 is a flowchart performed by a controller and illustrating a method for controlling the vehicle according to an exemplary embodiment of the present invention.

FIG. 5 is a flowchart illustrating a method for controlling the vehicle according to an exemplary embodiment of the present invention. The method for controlling the vehicle according to the exemplary embodiment of the present invention will hereinafter be described with reference to FIG. 5, FIG. 6, FIG. 7, FIG. 8, FIG. 9 and FIG. 10.

The vehicle 100 may perform the anti-collision function upon receiving the ignition command.

During execution of the anti-collision function the vehicle may activate the detection part, may confirm traveling information detected by the traveling information detector, image information detected by the image detector, and obstacle information detected by the obstacle detector (Operation 181), and may further confirm environment information detected by the environment information detector.

Figure 6:
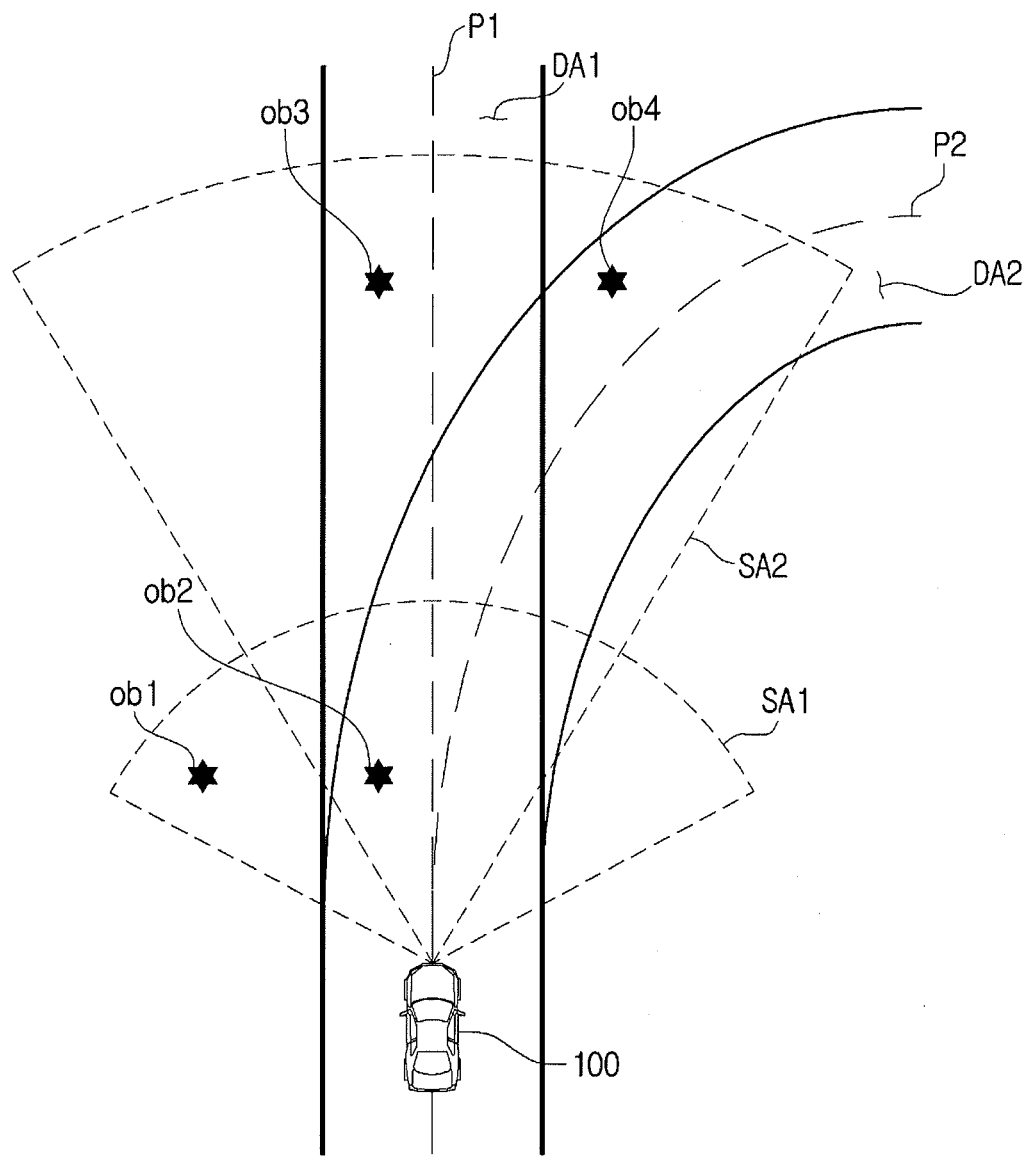
FIG. 6, FIG. 7, FIG. 8, FIG. 9, and FIG. 10 are conceptual diagrams illustrating methods for establishing the existable region of obstacles of a vehicle according to an exemplary embodiment of the present invention.

Referring to FIG. 6, the vehicle may estimate a traveling route P1 of the ego vehicle on the basis of speed information and steering information (Operation 182).

In addition, during estimation of the ego-vehicle traveling route, the vehicle may further use yaw-rate information and acceleration information.

The vehicle may confirm position information of the estimated traveling route, and may establish an obstacle recognition region DA1 on the basis of the confirmed position information (Operation 183).

The vehicle may acquire information of the obstacle detected by at least one of the image detector and the obstacle detector, and may conform information regarding the acquired obstacle.

In the instant case, the obstacle information may include at least one of position information, size information, type information, and shape information of the obstacle.

In more detail, the vehicle may receive the image signal detected by the image detector 142, may process the received image signal, and may change the size and format to increase a signal processing speed, resulting in increased image quality.

As described above, the vehicle may apply vision technology to the image signal wherein the vehicle can recognize obstacles ob1 and ob2 located in the detection region SA1 of the image detector on the basis of the received image information. In the instant case, the vision technology may clear the image signal, may perform noise cancellation of the resultant image signal, may generate image information, and may separate each object from the generated image information.

The vehicle may acquire the size and position information of the recognized obstacle, and may determine whether the obstacle is a bicycle, a pedestrian, a road sign, a traffic light, or another vehicle on the basis of the acquired size and position information of the obstacle.

The vehicle 100 may scan the peripheral region (i.e., forward, right/left, and side regions) thereof using the obstacle detector 143, and may detect obstacles ob2, ob3, and ob4 contained in the detection region SA2 of the obstacle detector.

In the instant case, the detection region SA1 of the image detector and the detection region SA2 of the obstacle detector may be changed according to output capabilities (or specifications) of the image detector and the obstacle detector.

The vehicle 100 may group the signals detected by the obstacle detector as spot data, and may acquire shape and position information of the obstacle.

Here, grouping of the spot data may include connecting a plurality of neighboring points on the basis of the direction and distance between the ego vehicle and the obstacle and the number of spots between the ego vehicle and the obstacle.

As described above, the vehicle 100 may acquire information regarding the peripheral obstacle by grouping the spot data.

In addition, the vehicle may also acquire obstacle type information on the basis of the obstacle shape information.

The vehicle may confirm information regarding the obstacle recognition region, may acquire information regarding the obstacles ob2, ob3, and ob4, each of which is used as a warning target, contained in the obstacle recognition region DA1 from among the detected obstacles on the basis of the confirmed obstacle recognition region information and the confirmed obstacle position information (Operation 184), and may confirm position information of the acquired obstacle to be used as the warning target.

The vehicle may acquire traveling road information on the basis of at least one of navigation information and communication information (Operation 185).

In more detail, when the navigation function is selected, the vehicle 100 may confirm current position information received by the communication interface, and may display map information belonging to a predetermined range from the confirmed current position information on the UI 129 (Operation 129).

When destination information is input to the vehicle, the vehicle may acquire route information from the current position to the destination, may display map information matched to the acquired route information on the UI 129, and may output video and audio data indicating navigation information on the basis of the route information and the map information.

During execution of the navigation function, the vehicle may acquire traveling road type information on the basis of navigation information.

In the instant case, the road type information may include at least one of road shape information, road type information, a total number of two-way lanes (round-trip 2-lane road) of the road, and a total number of one-way lanes of the road.

The navigation information may include at least one of current position information, map information, and route information.

The communication information may include at least one of communication information with another vehicle, communication information with the server, and communication information with the infrastructure, and may include type information of the traveling road of the ego vehicle.

The vehicle may recognize a lane on the basis of image information, may recognize the traveling lane of the ego vehicle on the basis of the recognized lane information, and may confirm information of the recognized traveling lane (Operation 186).

The vehicle may also recognize the ego-vehicle traveling lane on the basis of the current position information, communication information with another vehicle, and communication information with the infrastructure.

In the instant case, the communication information with another vehicle may include at least one of position information of another vehicle and lane information of another vehicle. The communication information with the infrastructure may include at least one of the infrastructure position information and information regarding the distance to the infrastructure.

The vehicle may acquire the actual route information P2 on the basis of the confirmed traveling lane information and the road type information, and may re-establish the obstacle recognition region DA2 on the basis of the acquired actual route information.

In addition, the vehicle may also re-establish the obstacle recognition region DA2 using the actual route information and the quadratic function.

The vehicle may determine the type of an obstacle configured for being located in the road on the basis of the acquired road type information.

That is, the vehicle may store type information of the obstacle having a sufficient existence probability higher than a reference probability for each road type.

The vehicle may establish the existable region for each obstacle type on the basis of information regarding the re-established obstacle recognition region, information regarding the detection region of the image detector, and information regarding the obstacle detector (Operation 187).

In the instant case, the re-established obstacle recognition region DA2 may be one of a region between border lines of the left and right lanes on the basis of the ego-vehicle traveling lane, a region between the left and right border lines within a predetermined distance on the basis of the right and left lanes of the ego-vehicle traveling lane, and a region extending to the boundary line of at least one of the image detector and the obstacle detector.

The vehicle may determine the probability of existence for each obstacle type on the basis of information of the re-established recognition region, the road type information, and the traveling lane information, and may establish the existable region for each obstacle type on the basis of the determined probability of existence for each obstacle type. A detailed description thereof will hereinafter be described with reference to FIG. 7 through FIG. 10.

The vehicle may establish the existable region for each obstacle type with respect to the left and right regions of the ego vehicle on the basis of the ego-vehicle position information.

In more detail, the controller 150 may establish the existable region of another vehicle and the existable region of a pedestrian with respect to the left region, and may establish the existable region of another vehicle and the existable region of a pedestrian with respect to the right region.

Figure 7:
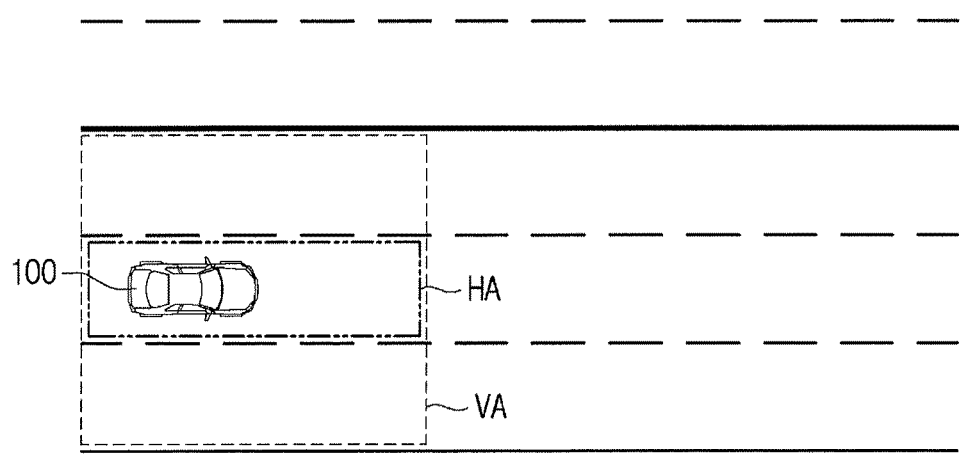

Referring to FIG. 7, the vehicle may confirm the traveling road type on the basis of navigation information and communication information, and may recognize the current traveling lane on the basis of image information.

The vehicle may determine that the road type is a six-way lane (i.e., round-trip 6-lane road). When the traveling road is a second lane from among six lanes, the vehicle may determine that the probability of existence of another vehicle located in the left region of the ego vehicle is equal to or higher than a reference probability, may set a left border lane of the left lane to a left borderline of the existable region of another vehicle (i.e., another-vehicle existable region), may determine that the probability of existence of another vehicle located in the right region of the ego-vehicle lane is equal to or higher than a reference probability, and may set a right border lane of the right lane to a right borderline of the existable region of another vehicle, establishing another-vehicle existable region (VA).

The vehicle may confirm that the road type is an expressway, may determine that the probability of existence of the pedestrian located in the right and left regions of the ego vehicle is less than a reference probability, and may set the ego-vehicle existable region (VA) only with respect to the forward region of the ego vehicle.

That is, the vehicle may not establish the existable region of the pedestrian with respect to the right and left regions of the ego vehicle.

Figure 8:
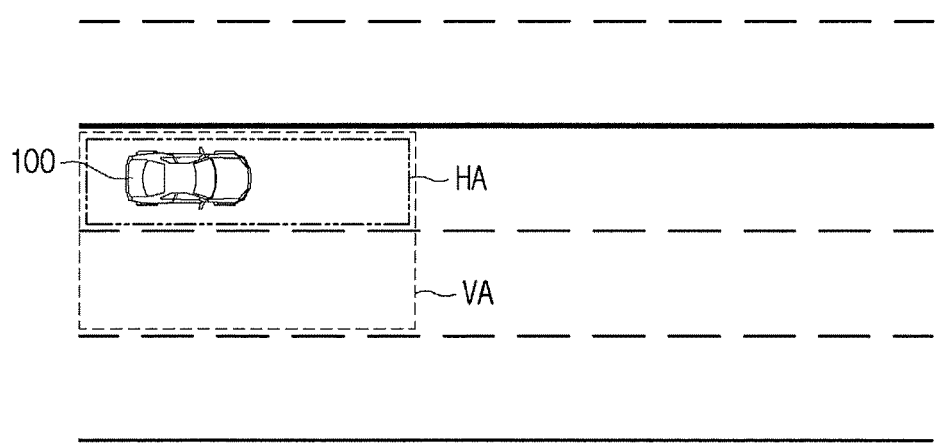

As shown in FIG. 8, the vehicle may confirm the traveling road type on the basis of navigation information and communication information, and may recognize the current traveling lane on the basis of image information.

The vehicle may determine that the road type is a four-way lane (i.e., round-trip 4-lane road). When the traveling road is a first lane from among four lanes, the vehicle may determine that the probability of existence of another vehicle located in the left region of the ego vehicle is less than a reference probability, may set the left lane of the ego-vehicle lane to a left borderline of another-vehicle existable region, may determine that the probability of existence of another vehicle located in the right region of the ego-vehicle lane is equal to or higher than a reference probability, and may set a right lane of the right road to a right borderline of another-vehicle existable region, establishing another-vehicle existable region (VA).

The vehicle may confirm that the road type is an expressway, may determine that the probability of existence of the pedestrian, located in the right and left regions of the ego vehicle is less than a reference probability, and may set the pedestrian existable region (HA) only with respect to the forward region of the ego vehicle.

That is, the vehicle may not establish the existable region of the pedestrian with respect to the right and left regions of the ego vehicle.

Figure 9:
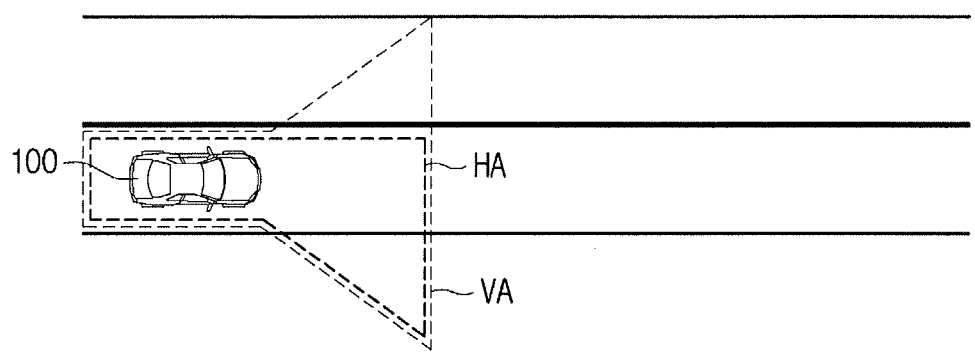

As shown in FIG. 9, the vehicle may confirm the traveling road type on the basis of navigation information and communication information, and may recognize the current traveling lane on the basis of image information.

When the vehicle determines that the road type is a two-way lane (i.e., round-trip 2-lane road), i.e., when the traveling road is a one-way lane (i.e., one-way road), the vehicle may determine that the probability of existence of another vehicle located in the left region of the ego vehicle is less than a reference probability, may set the left border lane of the left lane to a left borderline of another-vehicle existable region, may determine that the probability of existence of another vehicle located in the right region of the ego-vehicle lane is equal to or higher than a reference probability, and may set a boundary line of the right detection region from among the detection regions of the image detector and the obstacle detector configured to a right borderline of another-vehicle existable region, establishing another-vehicle existable region (VA).

That is, when another lane is located at a side surface of the recognized traveling lane, the vehicle may establish a borderline of the obstacle existable region on the basis of lane information of another lane. When another lane is not present at the side surface of the recognized traveling lane, the vehicle may establish a borderline of the obstacle existable region on the basis of a boundary line of the detection region of the image detector or the obstacle detector.

In the instant case, the operation for determining that the probability of existence of another vehicle located in the right region of the ego-vehicle lane is equal to or higher than a reference probability may include determining that the probability of existence of another vehicle is equal to or higher than the reference probability due to either one vehicle entering the ego-vehicle lane or the other vehicle parked at one side of the traveling lane. The above-mentioned decision information may be acquired by experimentation and experience, and may be pre-stored.

The right region of the ego-vehicle lane is an opposite lane, a traveling direction of which is opposite to the traveling direction of the ego vehicle. The other vehicle located in the right lane of the ego-vehicle lane is another oncoming vehicle. Therefore, the current traveling lane may be excluded from the right lane.

That is, when the road type is a one-way lane (i.e., one-way road) or when the vehicle travels in the first lane, the vehicle may determine that the probability of existence of another vehicle in the right region of the ego vehicle is less than a reference probability.

When the road type is a school zone, the vehicle may determine that the probability of existence of a pedestrian in the right and left regions of the ego vehicle is equal to or higher than a reference probability, and may establish the pedestrian existable region HA on the basis of boundary lines of detection regions of the image detector and the obstacle detector.

That is, since the vehicle has difficulty in acquiring information regarding the right lane when traveling on a one-way lane (i.e., a one-way road), the vehicle may establish the existable region of the obstacle on the basis of boundary lines of detection regions of the image detector and the obstacle detector.

Figure 10:
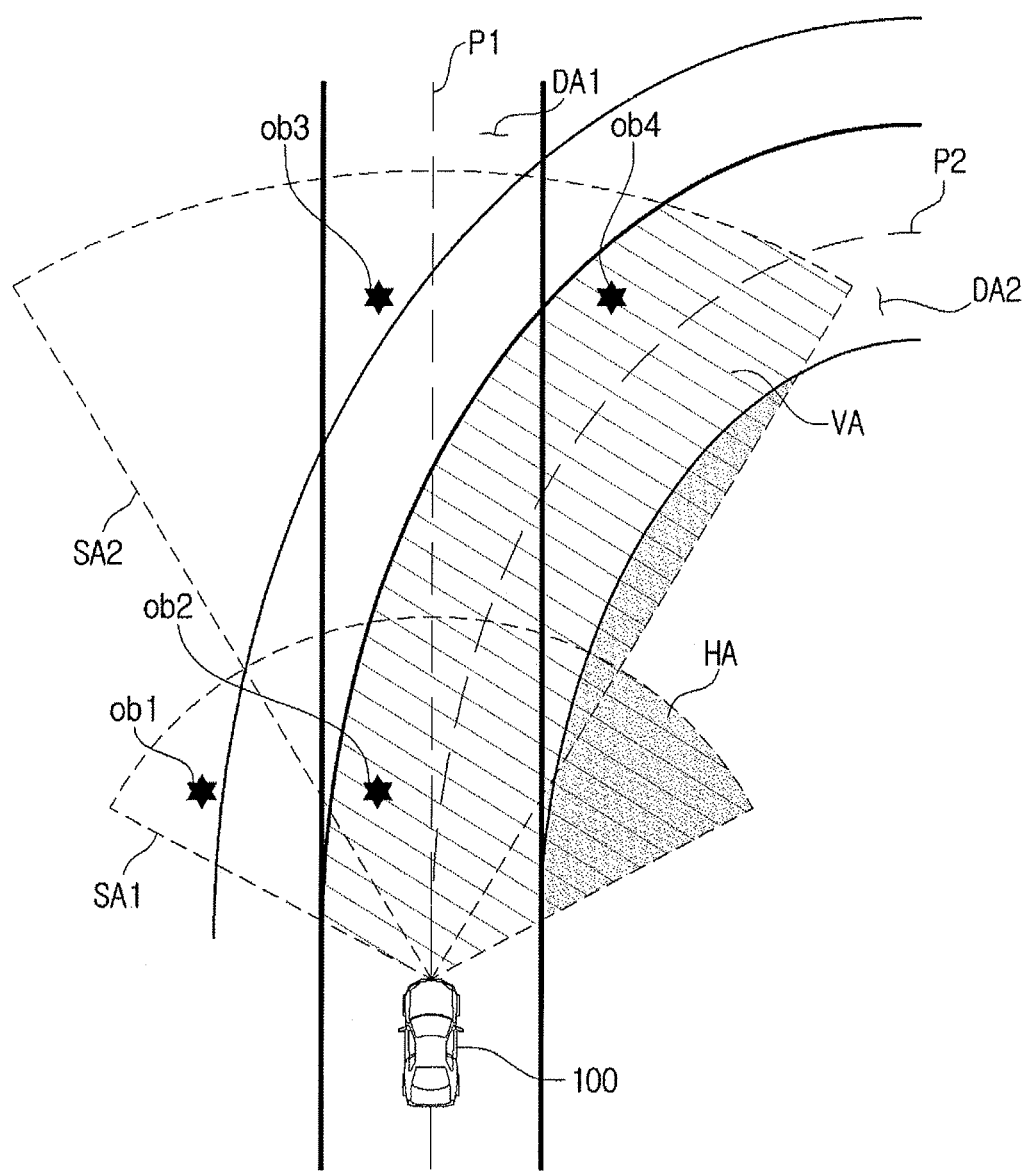

Referring to FIG. 10, the vehicle may confirm the traveling road type on the basis of navigation information and communication information, and may recognize a current traveling lane on the basis of image information.

When the road type is a two-way lane (i.e., a round-trip 2-lane road) and when the vehicle roads on the first lane from among two lanes of the road, the vehicle may determine that the probability of existence of another vehicle located in the left region of the ego vehicle is less than a reference probability, may set the left border lane of the left lane and the left lane of the ego-vehicle lane to a left borderline of another-vehicle existable region, may determine that the probability of existence of another vehicle located in the right region of the ego-vehicle lane is equal to or higher than a reference probability, and may set a right lane of the right road to a right borderline of another-vehicle existable region, establishing another-vehicle existable region (VA).

The vehicle determines that the road type is a city road and a curved road, determines that the probability of existence of the pedestrian located in the left region of the ego-vehicle lane is less than a reference probability, and establishes the existable region HA of the pedestrian on the basis of a boundary line of the right detection region from among the detection regions of the image detector and the obstacle detector.

The vehicle may acquire the actual obstacle information from among the obstacles to be used as the warning targets on the basis of information regarding the established existable region for each obstacle type and the position information of the recognized obstacle corresponding to a warning target (Operation 188). Here, the vehicle may acquire the actual obstacle information from the respective obstacle existable regions. The vehicle may control the warning device 160 and the braking device 170 needed for anti-collision on the basis of position information of the actual obstacle according to the respective obstacle types and the respective obstacle existable regions (Operation 189).

When the vehicle detects the obstacle in an overlap region between the another-vehicle existable region and the pedestrian existable region, the vehicle may also determine the obstacle type on the basis of detection information of the obstacle detected from the overlap region.

Referring to FIG. 10, the vehicle may determine obstacles ob2 and ob4 from among the warning-target objects ob2, ob3, and ob4 to be the actual obstacles on the basis of information regarding the existable region for each obstacle type, and may control the braking device and the warning device on the basis of the determined obstacle position information.

In addition, the obstacle type of the actual obstacles ob2 and ob4 is determined to be a vehicle, and the vehicle may output braking force and warning sound corresponding to the obstacle type (i.e., vehicle).

The vehicle may select the type of the warning sound on the basis of the obstacle type, may control output of the selected warning sound, and may control volume of the warning sound on the basis of the distance to the obstacle.

The vehicle may inform the vehicle driver of a first probability of danger using the warning light of the cluster or side-view mirrors, may perform visual warning by turning on the warning light, and at the same time may inform the vehicle driver of a second probability of danger through vibration of the seat belt.

The vehicle may control the brake to be kept at the pre-fill state wherein immediate braking of the vehicle is possible at any time.

When there occurs an extremely dangerous situation in which there is a high possibility of collision between the vehicle and the obstacle, the vehicle may perform automatic deceleration (i.e., the pre-brake function) within a predetermined scope, may control a Brake Assist System (BAS) function according to the degree of possibility of collision, and may operate the seat belt wherein the driver's body can also be fastened to the driver seat.

As is apparent from the above description, the vehicle and the method for controlling the same according to the embodiments can establish the presence-available region for each obstacle type, and can recognize the obstacle on the basis of the established presence-available region for each obstacle type to increase recognition accuracy of each obstacle, wherein accuracy of alarm sound output and braking function can also be increased according to increased accuracy of obstacle recognition.

The vehicle according to the embodiments can reduce the number of alarm sound output times and the number of braking execution times by increasing recognition accuracy for each obstacle, resulting in reduction of sense of difference. That is, the vehicle according to the embodiments can reduce the possibility of misrecognition caused by misunderstanding of the obstacle.

The vehicle according to the embodiments can reduce the possibility of collision with other vehicles located in a backward direction, caused by execution of false braking.

When the vehicle is an autonomous vehicle, the autonomous vehicle can improve autonomous traveling performance according to reduction in the number of obstacle misrecognition times and the number of incorrect braking actions.

The embodiments of the present invention can improve quality and marketability of the vehicle having an anti-collision function, can increase user satisfaction and user convenience of the vehicle, can also increase reliability and stability of the vehicle, and can guarantee product competitiveness.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
an image detector configured to acquire image information from a peripheral region of the vehicle;
an obstacle detector configured to detect an obstacle;
a communication interface configured to receive current position information; and
a controller configured to acquire type information of a road on a basis of the current position information and navigation information during execution of a navigation function, recognize a traveling lane on a basis of the image information, determine a type of an existable obstacle based on the type information of the road, confirm a probability of existence of each obstacle for each type of the existable obstacle in each of left and right regions of a traveling route on a basis of the type information of the road and information of the recognized traveling lane, set an obstacle existable region in at least one region in which the confirmed probability is equal to or higher than a reference probability, determine whether or not the detected obstacle is true or false on a basis of information regarding the obstacle existable region for each type of the existable obstacle, and control an anti-collision function on a basis of the determined true or false information of the detected obstacle.

2. The vehicle according to claim 1, wherein
the communication interface communicates with at least one of another vehicle, a server, and an infrastructure; and
the controller acquires the type information of the road on a basis of communication information received by the communication interface.

3. The vehicle according to claim 1, wherein the controller recognizes the obstacle on a basis of the image information.

4. The vehicle according to claim 3, wherein
when another lane is present in a side portion of the recognized traveling lane, the controller establishes a borderline of the obstacle existable region on a basis of a lane of another lane; and
when another lane is not present in the side portion of the recognized traveling lane, the controller establishes a borderline of the obstacle existable region on a basis of a boundary line of a detection region of the image detector or the obstacle detector.

5. The vehicle according to claim 1, further comprising:
a traveling information detector configured to detect traveling information,
wherein the controller is configured to estimate the traveling route on a basis of the detected traveling information, confirms position information of the detected obstacle, acquires information regarding an obstacle indicating a warning target contained in the estimated traveling route on a basis of the estimated traveling route and the detected obstacle position information, and acquires obstacle information from information of the warning-target obstacle on a basis of information regarding the obstacle existable region.

6. The vehicle according to claim 1, further comprising:
a warning device configured to output warning information on a basis of a command of the controller; and
a braking device configured to control braking force on a basis of a command of the controller.

7. The vehicle according to claim 6, wherein the controller is configured to control at least one of the warning device and the braking device on a basis of a type of the obstacle.

8. A method for controlling a vehicle comprising:
acquiring, by a controller, type information of a road from at least one of another vehicle, a server, an infrastructure, and a user interface (UI) configured to perform a navigation function;
recognizing, by the controller, information of a traveling lane on a basis of image information detected by an image detector;
confirming, the controller, a probability of existence of each obstacle in each of left and right regions of a traveling route on a basis of the type information of the road and the information of the traveling lane;
confirming, by the controller, type information of a first existable obstacle, which is located in the right region and has an existence probability higher than a reference probability;
setting, by the controller, a first obstacle existable region of the confirmed type information of the first existable obstacle;
confirming, by the controller, type information of a second existable obstacle, which is located at the right region and has an existence probability higher than a reference probability;
setting, by the controller, a second obstacle existable region of the confirmed type information of the second existable obstacle;
acquiring, by the controller, information regarding an obstacle from obstacles detected by an obstacle detector on a basis of the first obstacle existable region and the second obstacle existable region; and
controlling, by the controller, an anti-collision function on a basis of the acquired information regarding the obstacle.

9. The method according to claim 8, further comprising:
detecting the obstacle on a basis of the image information.

10. The method according to claim 9, wherein the establishing the obstacle existable region includes:
when another lane is present in a side portion of the recognized traveling lane, establishing a borderline of the obstacle existable region on a basis of a lane of another lane; and
when another lane is not present in the side portion of the recognized traveling lane, establishing a borderline of the obstacle existable region on a basis of a boundary line of a detection region of the image detector or the obstacle detector.

11. The method according to claim 10, wherein the acquiring the obstacle information comprising:
detecting traveling information;
estimating the traveling route on a basis of the detected traveling information;
acquiring information regarding an obstacle indicating a warning target contained in the estimated traveling route on a basis of the estimated traveling route information and detected obstacle position information; and
acquiring obstacle information from information of the obstacle indicating the warning target on a basis of information regarding the obstacle existable region.

12. The method according to claim 8, wherein the controlling the anti-collision function includes:
controlling at least one of a warning device and a braking device on a basis of a type of the detected obstacle.

* * * * *